(12) United States Patent
Seo (10) Patent No.: US 10,538,071 B2
(45) Date of Patent: Jan. 21, 2020

(54) FLOORING TILE MANUFACTURING APPARATUS

(71) Applicant: Jung Soo Seo, Seoul (KR)

(72) Inventor: Jung Soo Seo, Seoul (KR)

( * ) Notice: Subject to any disclaimer, the term of this patent is extended or adjusted under 35 U.S.C. 154(b) by 0 days.

(21) Appl. No.: 15/634,372

(22) Filed: Jun. 27, 2017

(65) Prior Publication Data

US 2018/0333942 A1    Nov. 22, 2018

(30) Foreign Application Priority Data

May 17, 2017    (KR) .................. 10-2017-0061089

(51) Int. Cl.
| | |
|---|---|
| *B32B 37/00* | (2006.01) |
| *B65H 20/30* | (2006.01) |
| *B65H 20/32* | (2006.01) |
| *B32B 38/00* | (2006.01) |
| *E04F 15/10* | (2006.01) |
| *B65H 20/34* | (2006.01) |

(52) U.S. Cl.
CPC ...... *B32B 37/0053* (2013.01); *B32B 38/0036* (2013.01); *B65H 20/30* (2013.01); *B65H 20/34* (2013.01); *E04F 15/107* (2013.01); *B32B 2419/04* (2013.01); *B65H 20/32* (2013.01)

(58) Field of Classification Search
CPC ............ B32B 37/0046; B32B 2419/04; B32B 37/0053; B32B 38/0036; E04F 15/107; B29C 48/28; B29C 47/28; B29C 48/0021; B29C 47/0021
USPC ........................................ 156/555, 543, 549
See application file for complete search history.

(56) References Cited

U.S. PATENT DOCUMENTS

| | | | | |
|---|---|---|---|---|
| 2,757,711 | A * | 8/1956 | Petry | .................. B32B 27/00 |
| | | | | 156/273.3 |
| 2003/0209306 | A1* | 11/2003 | Jones | ....................... B32B 5/00 |
| | | | | 156/72 |
| 2011/0174771 | A1* | 7/2011 | DeSanto | ............... B32B 37/025 |
| | | | | 216/32 |
| 2015/0165748 | A1* | 6/2015 | Anspach | ................. B32B 38/06 |
| | | | | 156/209 |
| 2015/0184334 | A1* | 7/2015 | Ross | ....................... B32B 37/12 |
| | | | | 428/203 |

(Continued)

FOREIGN PATENT DOCUMENTS

KR            100510836          8/2005

*Primary Examiner* — Philip C Tucker
*Assistant Examiner* — Jimmy R Smith, Jr.
(74) *Attorney, Agent, or Firm* — Novick, Kim & Lee, PLLC; Jae Youn Kim (57) ABSTRACT

Provided is a flooring tile manufacturing apparatus includes: a lower sheet supply unit configured to form and supply a lower sheet; a middle sheet supply unit configured to supply a middle sheet joined to an upper side of the lower sheet; a raw material supply unit configured to supply materials having different contents of a filler to the lower sheet supply unit and the middle sheet supply unit; a main roller configured to join the lower sheet and the middle sheet that have been received; a first sheet supply unit configured to supply a print sheet having a color or a pattern to the main roller; a second sheet supply unit configured to supply a transparent sheet to the main roller; and an ultraviolet (UV) coating unit configured to form a UV coating layer on a surface of the transparent sheet.

3 Claims, 6 Drawing Sheets

(56) References Cited

U.S. PATENT DOCUMENTS

2016/0060061 A1* 3/2016 Macura ................ B65H 16/10
 242/559
2016/0340916 A1* 11/2016 Wright ................ E04F 15/107

* cited by examiner

Fig. 1

*Prior Art*

FLOORING TILE MANUFACTURING APPARATUS

BACKGROUND OF THE INVENTION

1. Field of the Invention

The present invention relates to a flooring tile manufacturing apparatus, and more particularly to a flooring tile manufacturing apparatus installed on a floor to reduce energy and labor costs that are necessary to produce a flooring tile that may express the floor with a specific color, a specific pattern, and a specific texture and to increase productivity.

2. Description of the Prior Art

In general, flooring such as floor paper or tiles is constructed on a floor of a building, and the main material of the flooring such as floor paper or tiles is vinyl chloride that is light, flexible, and excellent in a cushioning property and a noise absorbing property.

The flooring, a main material of which is vinyl chloride, includes a substrate layer, a main material of which is a PVC resin, a print layer joined to an upper end of the substrate layer, and a transparent film layer joined to an upper end of the print layer. Then, if necessary, a coating layer for improving an anti-wear property and an anti-scratch property may be further joined to an upper end of the transparent film layer.

The substrate layer includes a PVC resin, which is a main material thereof, a filler, and a plasticizer, and the transparent film layer may be manufactured only of a PVC resin without using a filler. The flooring having the above configuration is used alone in a process of finishing the floor, or is used while being attached with various types of adherents or adhesives.

However, the flooring having the above structure may severely deteriorate bending stability due to a difference between coefficients of contraction between the transparent film layer and the substrate layer, causing a coming-out phenomenon during or after a construction process to make a seamed part unsmooth or causing deformation or distortion due to heat or moisture.

Figure 1:
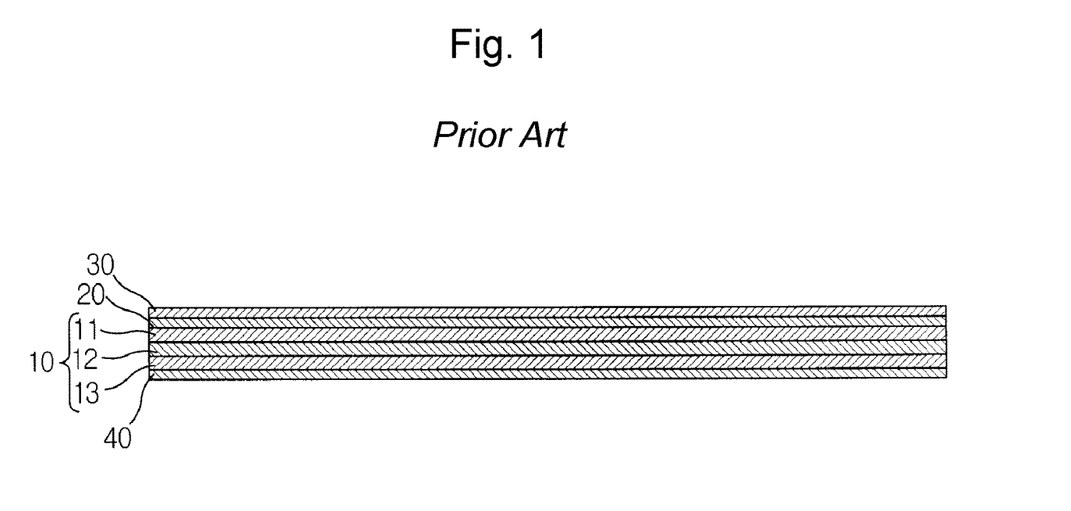
FIG. 1 is a conventional flooring having an improved bending stability.

In order to supplement the problems, a balance layer is formed at a lower end of the PVC substrate layer in a process of manufacturing the flooring. FIG. 1 is a sectional view of a conventional flooring having an improved bending stability.

As illustrated in FIG. 1, the conventional flooring having an improved bending stability includes a substrate layer 10, a main material of which is a PVC resin, a print layer 20 and a transparent film layer 30 sequentially joined to an upper side of the substrate layer 10, and a balance layer 40 joined to a lower end of the substrate layer 10.

Further, the substrate layer 10 includes an upper PVC layer 11, a lower PVC layer 13, and a nonwoven fabric layer 12 joined between the upper PVC layer 11 and the lower PVC layer 13.

In order to manufacture the above-structured conventional flooring having an improved bending stability, first, the print layer 20 and the transparent film layer 30 have to be prepared and the substrate layer 10 and the balance layer 40 have to be separately manufactured.

Further, in order to manufacture the substrate layer 10, a nonwoven fabric has to be inserted between the upper PVC layer 11 and the lower PVC layer 13 and then be heat-pressed after the upper PVC layer 11 and the lower PVC layer 13 are separately formed. Then, a process of cutting the upper PVC layer 11 and the lower PVC layer 13 into specific sizes is necessary in order to join the upper PVC layer 11 and the lower PVC layer 13 after the upper PVC layer 11 and the lower PVC layer 13 are formed at a high temperature, and a process of cooling and aging the upper PVC layer 11 and the lower PVC layer 13 is necessary in order to prevent deformation and distortion of the upper PVC layer 11 and the lower PVC layer 13. After the cooling and aging processes, the upper PVC layer 11 and the lower PVC layer 13 are reheated and heat-pressed to manufacture the substrate layer 10.

In this way, in order to join the substrate layer 10 and the balance layer 40 even after the substrate layer 10 is manufactured, a process of reheating and heat-pressing the substrate layer 10 and the balance layer 40 has to be performed via a process of cooling and aging the substrate layer 10.

As described above, according to the conventional flooring having an improved bending stability, because the upper PVC layer 11, the lower PVC layer 13, and the balance layer 40 have to be separately formed and heating, cooling, aging, and reheating have to be repeatedly performed in the forming and joining process, consumptions of energy, such as fuels and electricity, due to the reheating after the cooling is large, labor costs increase, and productivity decrease.

PRIOR TECHNICAL DOCUMENTS

Patent Documents (Patent Document 1) Korean Patent No. 10-0510836 (Aug. 30, 2005)

SUMMARY OF THE INVENTION

The present invention has been made in an effort to solve the above-mentioned problems, and provides a flooring tile manufacturing apparatus that may mass-produce a product by continuously performing forming and joining processes without cooling a material of the product, may reduce heat loss, electricity costs, and labor costs due to heating and cooling of a raw material of tiles, and may increase productivity by reducing investment costs and an installation space of a machine.

In accordance with an aspect of the present invention, there is provided a flooring tile manufacturing apparatus that continuously produces products in a linear process line without a curve from introduction of a raw material to production of a finished product, the flooring tile manufacturing apparatus including: a lower sheet supply unit configured to form and supply a lower sheet; a middle sheet supply unit configured to supply a middle sheet joined to an upper side of the lower sheet; a raw material supply unit configured to supply materials having different contents of a filler to the lower sheet supply unit and the middle sheet supply unit; a main roller configured to join the lower sheet and the middle sheet that have been received; a first sheet supply unit configured to supply a print sheet having a color or a pattern to the main roller; a second sheet supply unit configured to supply a transparent sheet to the main roller; and an ultraviolet (UV) coating unit configured to form a UV coating layer on a surface of the transparent sheet.

The material may include polyvinyl chloride (PVC), a plasticizer, and calcium carbonate ($CaCO_3$) as the filler. The calcium carbonate included in the material supplied to the lower sheet supply unit may correspond to 50 parts by weight or less for the material of supplied to the lower sheet supply unit 100 parts by weight. The calcium carbonate included in the material supplied to the middle sheet supply unit may correspond to 70 parts by weight or more for the material supplied to the middle sheet supply unit of 100 parts by weight.

The flooring tile manufacturing apparatus may further include: a lower preheating roller configured to receive the lower sheet from the lower sheet supply unit, heat the received lower sheet, and deliver the heated lower sheet to the main roller; an upper preheating roller configured to receive the middle sheet from the middle sheet supply unit, heat the received middle sheet, and deliver the heated middle sheet to the main roller; a first pressing roller configured to press the lower sheet and the middle sheet towards the main roller to bond the lower sheet and the middle sheet together; a second pressing roller configured to press the print sheet and the transparent sheet towards the main roller to bond the print sheet and the transparent sheet to a surface of the middle sheet; and a heater configured to heat the lower sheet and the middle sheet that move along the main roller.

A plurality of heating means may be installed in the interiors of the main roller, the lower preheating roller, and the upper preheating roller along circumferential surfaces thereof, respectively.

The flooring tile manufacturing apparatus may further include: a cooling unit including a plurality of cooling rollers, by which a raw material of a tile, to which the lower sheet, the middle sheet, the print sheet, and the transparent sheet are sequentially bonded, passes. A cooling means may be installed in each of the plurality of cooling rollers. Opposite surfaces of the raw material of the tile alternately may contact the plurality of cooling rollers.

The lower sheet supply unit may include: a lower sheet forming unit configured to form the lower sheet; and a lower sheet storing unit configured to store the lower sheet formed by the lower sheet forming unit and deliver the lower sheet to the main roller. The middle sheet supply unit may include: a middle sheet forming unit configured to form the middle sheet; and a middle sheet storing unit configured to store the middle sheet formed by the middle sheet forming unit and deliver the middle sheet to the main roller.

The lower sheet storing unit may include a plurality of lower sheet support rollers. The plurality of lower sheet support rollers may elevate according to a difference between a speed at which the lower sheet is introduced from the lower sheet forming unit to the lower sheet storing unit and a speed at which the lower sheet is discharged from the lower sheet storing unit to adjust an amount of the lower sheet accommodated in the lower sheet storing unit. The middle sheet storing unit may include a plurality of middle sheet support rollers. The plurality of middle sheet support rollers may elevate according to a difference between a speed at which the middle sheet is introduced from the middle sheet forming unit to the middle sheet storing unit and a speed at which the middle sheet is discharged from the middle sheet storing unit to adjust an amount of the middle sheet accommodated in the middle sheet storing unit,

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 5:
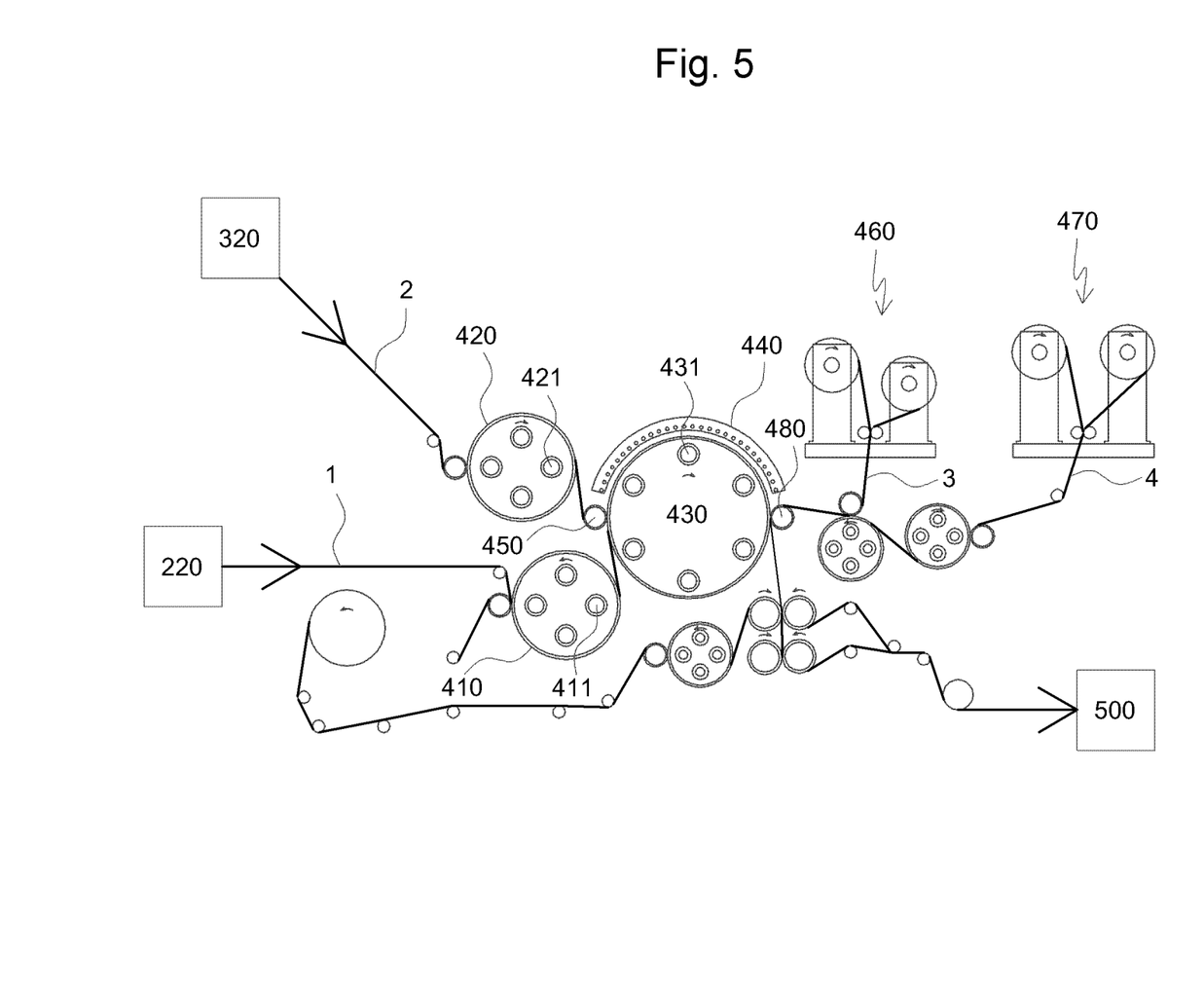
FIG. 5 is a view illustrating a combination unit according to the embodiment of the present invention.

First, referring to FIG. 5, a flooring tile of the present invention has a structure in which a lower sheet 1, a middle sheet 2, a print sheet 3 having a pattern or a color, a transparent sheet 4, and an ultraviolet (UV) coating layer (not illustrated) are sequentially stacked. The thicknesses of the print sheet, the transparent sheet, and the UV coating layer are very thin and the contraction rates thereof are high as compared with the middle sheet. Accordingly, while the print sheet, the transparent sheet, and the UV coating layer are joined to the middle sheet, bending or distortion of the flooring tile may be caused by the difference between the contraction rates. In order to solve the problems, the lower sheet is attached to a surface that is opposite to the surface to which the print sheet, the transparent sheet, and the UV coating layer are attached with respect to the middle sheet.

Meanwhile, conventionally, in order to manufacture a flooring tile having a total thickness of 3T, a total of three sheets including one lower sheet (0.9T) and two middle sheets (0.9T) are used, the three sheets are individually produced at a temperature of 180 degrees and are cooled to an atmospheric temperature of 20 degrees, and the cooled lower sheet and middle sheets are wound in a roll state and then are preserved. Further, in order to combine the lower sheet and the middle sheets closely, they have to be reheated to a temperature of 180 degrees. For this reason, in the conventional manufacturing process, the heat loss, the electricity costs, the labor costs, and the investment costs and installation space for machines are excessive and consumptions are high in proportion of the production rate of the products.

The reason why the thickness of the lower sheet and the middle sheets is 0.9T is that productivity decreases as heat slowly penetrates into the lower sheet or the middle sheets having a thickness of 0.9T or more when the lower sheet or the middle sheets are heated and continuous production becomes impossible as the production is ceased in spite that the heat may rapidly penetrates into the interiors of the lower sheet or the middle sheets due to the relatively small thicknesses in the case of the lower sheet or the middle sheets of a thickness of 0.9T or less.

In particular, because one lower sheet (0.9T) and four middle sheets (0.9T) have to be produced to produce a product having a thickness of 5T and a total of 7 sheets including one transparent sheet (0.3T) and one print sheet (0.08T) have to be combined, the manufacturing apparatus becomes complex and the volume and installation space of the manufacturing apparatus increase. Because when one middle sheet (3.6T) is manufactured to decrease the volume and installation space of the manufacturing apparatus, a time period for heating the middle sheet to a temperature of 180 degrees, at which the middle sheet may be combined at an atmospheric temperature rapidly increases, there is a limit in increasing the productivity of the product.

Hereinafter, a flooring tile manufacturing apparatus of the present invention will be described in detail with reference to the accompanying drawings.

As illustrated in FIGS. 2 to 6, the flooring tile manufacturing apparatus according to the embodiment of the present invention includes a raw material supply unit 100, a lower sheet supply unit 200, a middle sheet supply unit 300, a combination unit (a lower preheating roller 410, an upper preheating roller 420, and a main roller 430, a heater 440, a first pressing roller 450, a first sheet supply unit 460, a second sheet supply unit 470, a second pressing roller 480), a cooling unit 500, a UV coating unit 600, an aging unit 700, a cutting unit 800, and an automatic packing unit 900. The components of the flooring tile manufacturing apparatus according to the embodiment of the present invention are disposed in a straight line such that the flooring tiles may be mass-produced while the material and the raw material of the tiles may be supplied without being ceased.

Figure 2:
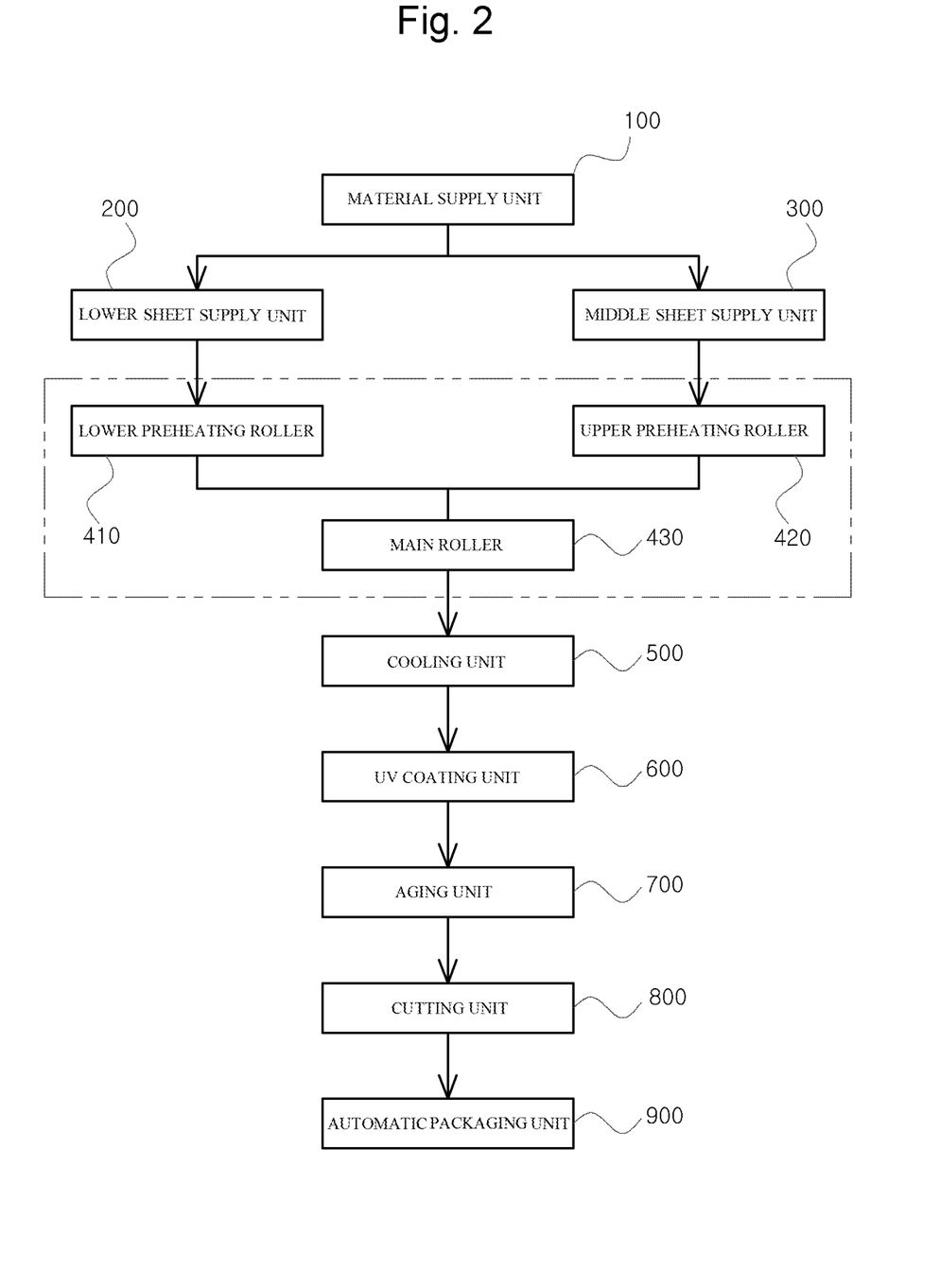
FIG. 2 is a view schematically illustrating a movement path of a material for manufacturing a flooring tile and a raw material of the tile according to an embodiment of the present invention.

The raw material supply unit 100 stores the materials for a lower sheet 1 and a middle sheet 2, and supplies materials having different contents of fillers to the lower sheet supply unit 200 and the middle supply unit 300.

The materials for forming the lower sheet 1 and the middle sheet 2 include polyvinyl chloride, a plasticizer (NEO-T), a fillers and a plasticizer for making the formed product flexible. The filler improves physical properties such as strength and hardness, and employs calcium carbonate ($CaCO_3$) in this embodiment. The filler is called hard coal or carbonized coal, and may employ various fillers other than calcium carbonate.

Meanwhile, calcium carbonate included in a material of 100 parts by weight supplied to the lower sheet supply unit 200 corresponds to 50 parts by weight or less, and calcium carbonate included in a material of 100 parts by weight supplied to the middle sheet supply unit 300 corresponds to 70 parts by weight or more.

Although the contraction rate of calcium carbonate, that is, the filler become lower, making it easy to prevent deformation of the filler and maintain the shape of the filler as the content of the filler becomes higher, the filler may be cracked or broken and costs increase if the weight percent of the filler becomes excessive. Because it is necessary to lower the contraction rate and deformation rate of the middle sheet 2, the filler of 70 parts by weight or more is included for the material of the middle sheet 2 of 100 parts by weight. Accordingly, in order to satisfy balance of the contraction and deformation by the print sheet 3 and the transparent sheet 4 and prevent cracking or breaking of the middle sheet 2 by adding flexibility, the lower sheet 1 including the filler of 50 parts by weight or less for the material of 100 parts by weight is coupled to the middle sheet 2.

The preferable composition ratio of the lower sheet 1 is as Table 1.

TABLE 1

| Composition | Polyvinyl Chloride | Filler | Plasticizer |
| --- | --- | --- | --- |
| Ratio | 36.3 wt % | 47.3 wt % | 16.4 wt % |

The preferable composition ratio of the middle sheet 2 is as Table 2.

TABLE 2

| Composition | Polyvinyl Chloride | Filler | Plasticizer |
| --- | --- | --- | --- |
| Ratio | 17 wt % | 71.9 wt % | 11.1 wt % |

The contraction rate of the formed product varies according to the content of the filler (calcium carbonate), and accordingly, a difference between the contraction rates of the lower sheet 1 and the middle sheet 2 occurs.

The present invention minimizes deformation and distortion of the flooring tile based on the balance of the contraction rate by the print sheet 3, the transparent sheet 4, and the UV coating layer joined to one surface of the middle sheet 2 and the contraction rate by the lower sheet 1 joined to the other surface of the middle sheet 2. The lower sheet 1 is also generally called a balance sheet.

Although not separately illustrated in the drawings, the material supply unit 100 includes a PVC tank for storing polyvinyl chloride and a filler tank for storing the filler, and includes a PVC weighing tank, a filler weighing tank, a plasticizer weighing tank, and a pigment weighing tank. The PVC weighing tank, the filler weighing tank, the plasticizer weighing tank, and the pigment weighing tank weigh the materials according to a specific ratio, and then delivers the weighed materials to a lower mixing tank 211 and an upper mixing tank 311.

The lower sheet supply unit 200 forms and supplies the lower sheet 1. The lower sheet supply unit 200 includes a lower sheet forming unit 210 for forming the lower sheet 1 and a lower sheet storing unit 220 for storing the lower sheet 1.

Figure 3:
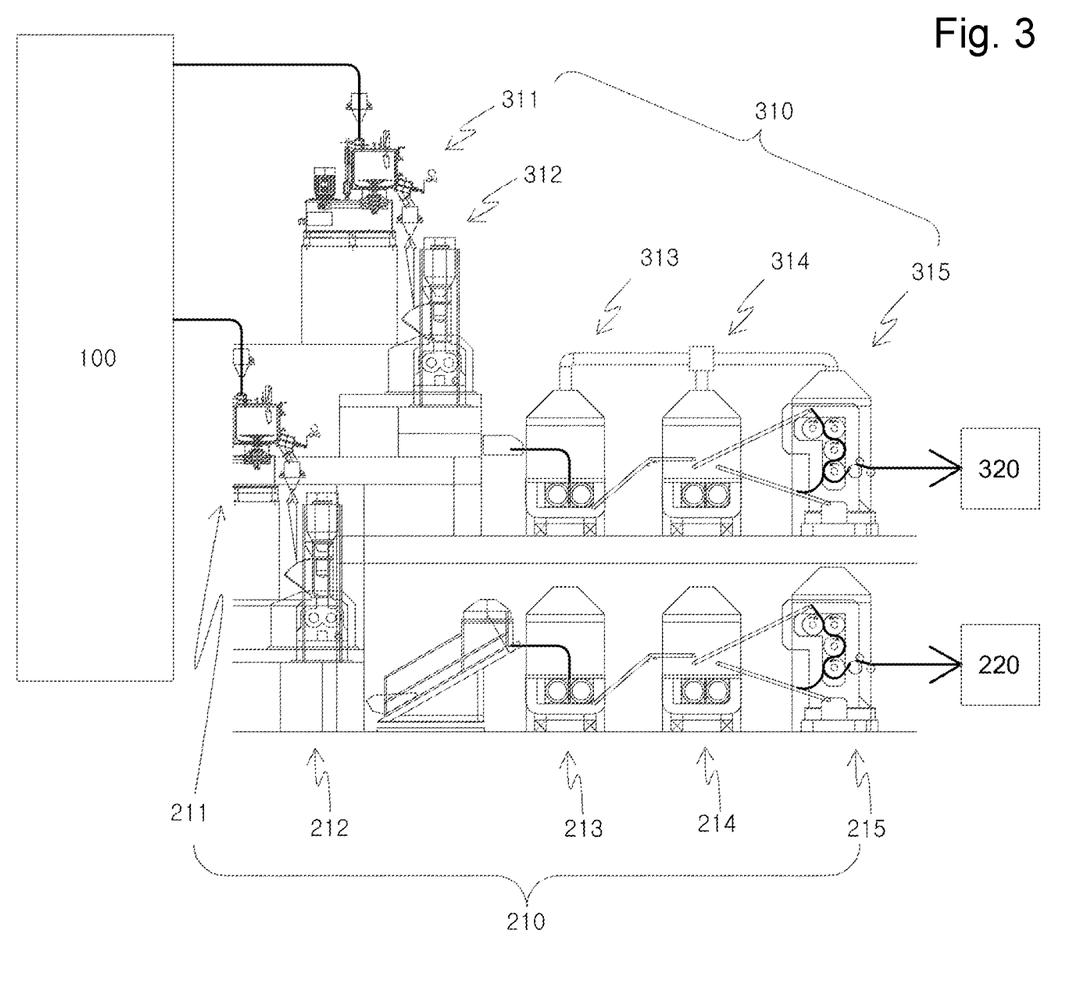
FIG. 3 is a view schematically illustrating configurations of a lower forming part and a middle forming unit according to the embodiment of the present invention.

As illustrated in FIG. 3, the lower sheet forming unit 210 includes a lower mixing tank 211, a lower extruder 212, first and second lower mixing rollers 214, and a lower calendar roller 215, and the material passes in a sequence. The lower mixing tank 211 receives the material for forming the lower sheet 1 from the material supply unit 100 and mixes the material. The lower extruder 212 makes a form of dough from the materials mixed by the lower mixing tank 211 through heat (170 to 180 degrees), pressure, and friction. In the present embodiment, two lower extruders 212 are used to mass-produce a thick lower sheet 1. The first lower mixing roller 213 includes two heating rollers, and compresses and kneads the material by passing the material kneaded by the lower extruder 212 between the two heating rollers (150 to 170 degrees). The second lower mixing roller 214 compresses and kneads the material that passed through the first lower mixing roller 213 to a temperature of 160 to 180 degrees again, and supplies the kneaded material to the lower calendar roller 215. The lower calendar roller 215 makes a form of a plate having a specific thickness and a specific width from the mixed and kneaded material by using the aperture between the heating rollers and delivers the plate to the lower sheet storing unit 220. The lower calendar roller 215 includes a plurality of heating rollers, and a roller, through which the material passes first, of a plurality of rollers of the lower calendar roller 215 heats the material to 140 to 160 degrees and then the heating rollers heats the material to 160 to 180 degrees. In this way, the lower sheet 1 that passed through the lower calendar roller 215 is delivered to the lower sheet storing unit 220 by a cooling mesh conveyor of 120 to 140 degrees.

Figure 4:
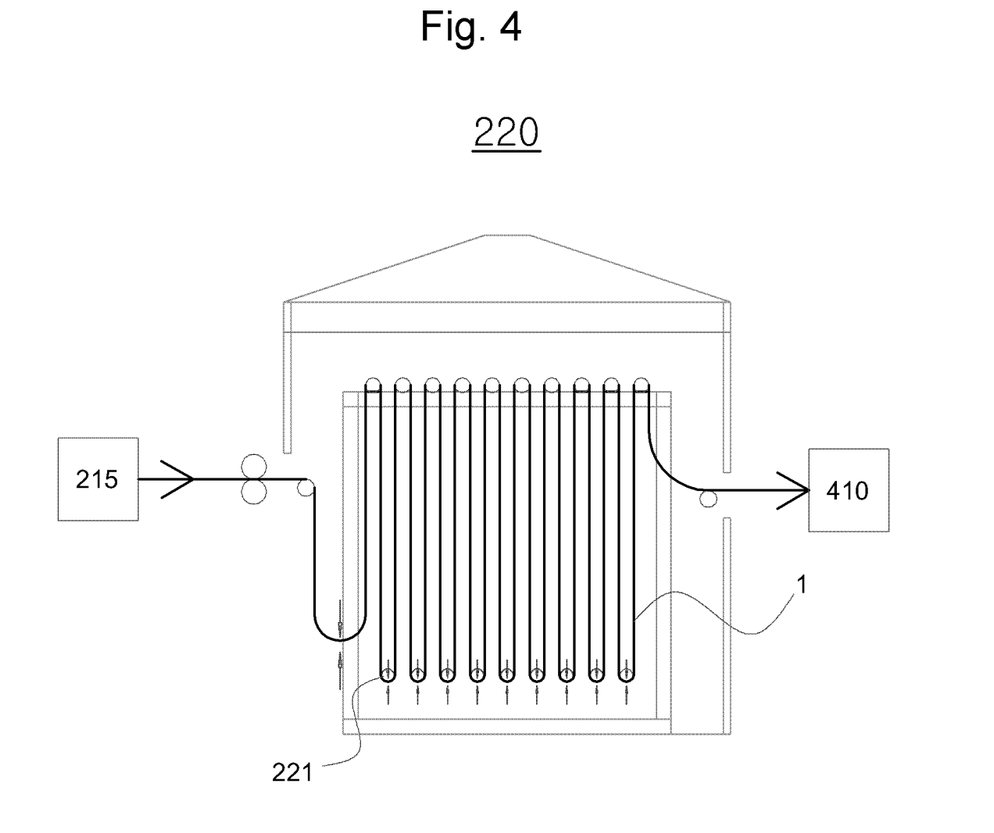
FIG. 4 is a view illustrating a lower storage unit according to the embodiment of the present invention.

As illustrated in FIG. 4, the lower sheet storing unit 220 includes a plurality of lower sheet support rollers 221, a sensor (not illustrated), and a control unit (not illustrated), and the plurality of lower support rollers 221 elevate to adjust an amount of the lower sheet 1 accommodated in the lower sheet storing unit 220 according to a difference between a speed at which the lower sheet 1 is introduced from the lower sheet forming unit 210 to the lower sheet storing unit 220 and a speed at which the lower sheet 1 is discharged from the lower sheet storing unit 220. In detail, if the introduction speed of the lower sheet 1 is higher than the discharge speed of the lower sheet 1, the lower sheet 1 stored in the lower sheet storing unit 220 is discharged first while the plurality of lower sheet support rollers 221 are sequentially lifted, and if the introduction speed of the lower sheet 1 is lower than the discharge speed of the lower sheet 1, the lower sheet 1 introduced while the plurality of lower sheet support rollers 221 is sequentially lowered is stored in the lower sheet storing unit 220. Further, the lower sheet 1 stored in the lower sheet storing unit 220 is maintained at a temperature of 110 to 130 degrees.

Meanwhile, if the introduction speed of the lower sheet 1 is the same as the discharge speed of the lower sheet 1, a total amount of the lower sheet 1 stored in the lower sheet storing unit 220 is not changed and the lower sheet support rollers 221 do not move.

The lower sheet 1 is stored in the interior of the above-mentioned lower sheet storing unit 220, and an upper cover part of the lower sheet storing unit 220 may be lifted such that the interior of the lower sheet storing unit 220 is opened.

The middle sheet supply unit 300 receives the material for forming the middle sheet 2 from the material supply unit 100 and forms and supplies the middle sheet 2. The middle sheet supply unit 300 includes a middle sheet forming unit 310 for forming the middle sheet 2 and a middle sheet storing unit 320 for storing the middle sheet 2. The middle sheet forming unit 310 and the middle sheet storing unit 320 are located above the lower sheet forming unit 210 and the lower sheet storing unit 220, and the structures and functions thereof are the same as those of the lower sheet forming unit 210 and the lower sheet storing unit 220, and thus a detailed description thereof will be omitted (see FIGS. 3 and 4).

As illustrated in FIG. 5, the combination unit includes a lower preheating roller 410, an upper preheating roller 420, a main roller 430, a heater 440, a first pressing roller 450, a first sheet supply unit 460, a second sheet supply unit 470, and a second pressing roller 480.

The lower preheating roller 410 receives the lower sheet 1 from the lower sheet supply unit 200 and delivers the lower sheet 1 to the main roller 430 after heating the lower sheet 1 to 170 to 190 degrees. A plurality of heating means 411 are installed in the interior of the lower preheating roller 410 along a circumferential surface of the lower preheating roller 410 to heat the lower sheet 1 passing by the lower preheating roller 410.

The upper preheating roller 420 receives the middle sheet 2 from the middle sheet supply unit 300 and delivers the middle sheet 2 to the main roller 430 after heating the middle sheet 2 to 170 to 190 degrees. A plurality of heating means 421 are installed in the interior of the upper preheating roller 420 along a circumferential surface of the upper preheating roller 420 to heat the middle sheet 2 passing by the upper preheating roller 420.

As mentioned above, because the lower sheet 1 and the middle sheet 2 are delivered to the lower sheet preheating roller 410 and the upper preheating roller 420 while being maintained at a high temperature after being heated when the materials are mixed and formed through the lower sheet supply unit 200 and the middle sheet supply unit 300, a temperature deviation from an initial temperature to a target temperature that is necessary for joining the lower sheet 1 and the middle sheet 2 is not large when the lower sheet 1 and the middle sheet 2 is heated to the target temperature by the lower preheating roller 410 and the upper preheating roller 420. Accordingly, consumption of energy for heating may be reduced. Further, because the middle sheet 2 is delivered while being maintained at a high temperature although the heating time may be delayed to heat even the interior of the middle sheet 2 to the target temperature when the thickness of the middle sheet 2 is 1T (1 mm) or more, the interior of the middle sheet 2 is maintained at a temperature that is higher than that of the surface of the middle sheet 2 so that the middle sheet 2 may be rapidly heated to the target temperature even when the thickness of the middle sheet 2 is large. Accordingly, the process may be rapidly performed and the products may be mass-produced even when the thickness of the middle sheet 2 is large.

The main roller 430 receives and joins the lower sheet 1 and the middle sheet 2. A plurality of heating means 431 are installed in the interior of the main roller 430 along a circumferential surface of the main roller 430 to maintain the temperatures of the lower sheet 1 and the middle sheet 2 passing by the main roller 430 to 170 to 190 degrees.

The above-mentioned heating means 411, 421, and 431 may be heating wires passing through the rollers or heating fluids passing through the passages formed in the interiors of the rollers.

The heaters 440 are located above the main roller 430 to heat the lower sheet 1 and the middle sheet 2 moving along the main roller 430. That is, opposite surfaces of the lower sheet 1 and the middle sheet 2 moving along the main roller 430 are heated by the heater 440.

The first pressing roller 450 presses the lower sheet 1 and the middle sheet 2 towards the main roller 430 to bond the lower sheet 1 and the middle sheet 2 together.

The first sheet supply unit 460 supplies the print sheet 3 having a color or a pattern to the main roller 430. The first sheet supply unit 460 may include two rollers such that the two roller may be alternately used according to the situation.

The second sheet supply unit 470 supplies the transparent sheet 4 to the main roller 430. The second sheet supply unit 470 also may include two rollers such that the two roller may be alternately used according to the situation.

The second pressing roller 480 presses the print sheet 3 and the transparent sheet 4 towards the main roller 430 to bond the print sheet 3 and the transparent sheet 4 to a surface of the middle sheet 2.

Figure 6:
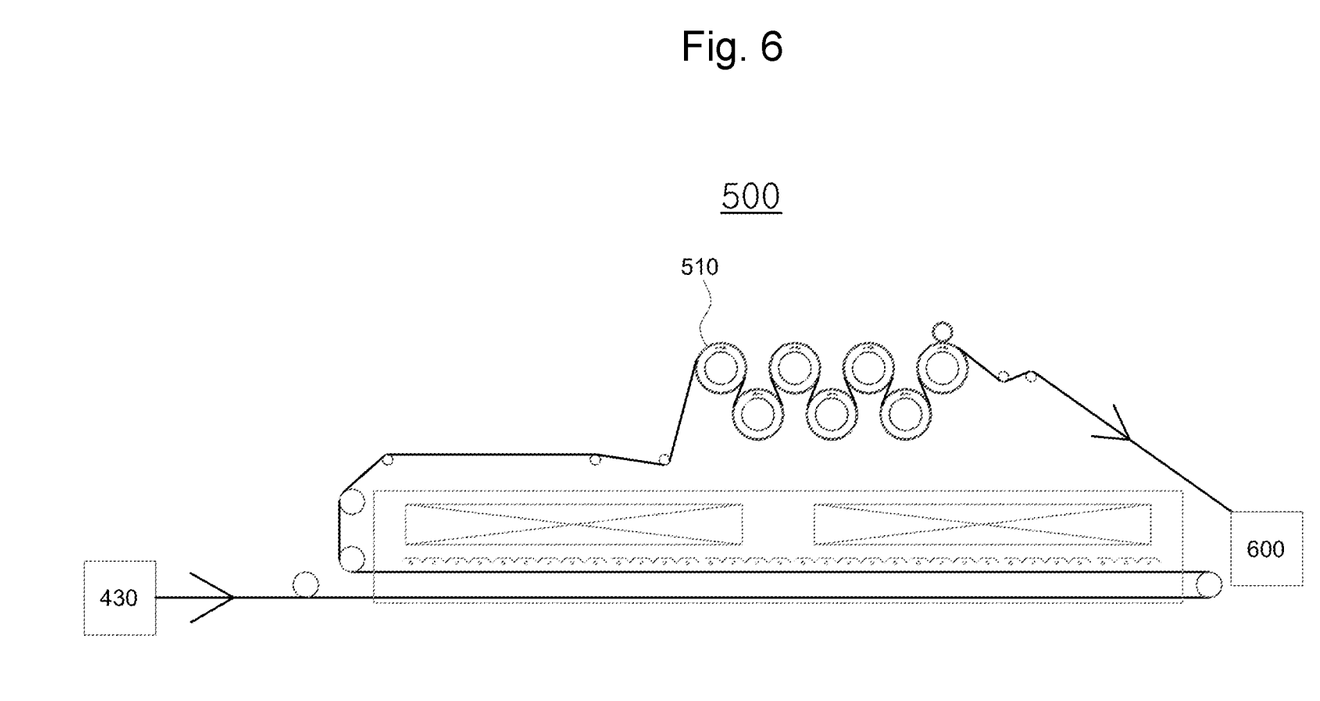
FIG. 6 is a view illustrating a cooling unit part according to the embodiment of the present invention.

As illustrated in FIG. 6, the cooling unit 500 includes a plurality of cooling rollers 510 by which the raw material of the tile, to which the lower sheet 1, the middle sheet 2, the print sheet 3, and the transparent sheet 4 are sequentially bonded, passes. A cooling means is installed in each of the plurality of cooling rollers 510, and opposite surfaces of the raw material of the tile alternately contact the plurality of cooling rollers 510 to be cooled. The cooling means may be cooling water passing through the passages formed in the interiors of the cooling rollers 510. The raw material of the tile is cooled to 20 to 40 degrees by the cooling unit 500.

The UV coating unit 600 forms a UV coating layer on a surface of the transparent sheet 4. In detail, the UV coating unit 600 UV dries the surface of the transparent sheet 4 by fusing a UV ray to the surface of the transparent sheet 4 to increase a strength of the surface of the transparent sheet 4, extending the life span of the transparent sheet 4 and preventing scratching.

The aging unit 700 is classified into a hot water ager and a cold water ager. The hot water ager prevents contraction of a product by aging the raw material of the tile that passed through the UV coating unit 600 when the raw material of the tile is fed while being submerged in water of 80 to 90 degrees. The hot water ager includes an electric heater 440 and a steam line. Further, the cold water ager maintains constant resilient characteristics of the product when the raw material of the tile that passed through the hot water ager is fed while being submerged in cold water of a specific temperature.

The cutting unit 800 cuts the raw material of the tile according to the size of the final product. The cutting unit 800 may adjust the work rate according to the production rate of the product by alternately using the two cutting machines. Further, after the cutting of the raw material of the tile, four recesses may be machined in the finished product to increase convenience of construction and minimize contraction and expansion of the product.

The automatic packaging unit 900 automatically packages the cut products in a box after loading the products.

Accordingly, the flooring tile manufacturing apparatus may continuously perform a process of manufacturing a flooring tile through the above-mentioned components, and may improve the quality and productivity of the product.

According to the flooring tile manufacturing apparatus of the present invention, a product may be mass-produced by continuously performing forming and joining processes without cooling a material of the product, heat loss, electricity costs, and labor costs may be reduced due to heating and cooling of a raw material of tiles, and productivity may be increased by 300% or more by reducing investment costs and an installation space of a machine.

The flooring tile manufacturing apparatus according to the present invention is not limited to the above-mentioned embodiments, and may be variously deformed without departing from the spirit of the present invention.

What is claimed is:

1. A flooring tile manufacturing apparatus, comprising:
    a lower sheet supply assembly configured to form and supply a lower sheet;
    a middle sheet supply assembly configured to supply a middle sheet;
    a raw material supply assembly configured to supply materials having a filler to the lower sheet supply assembly and the middle sheet supply assembly;
    a lower preheating roller configured to receive the lower sheet from the lower sheet supply assembly to heat the received lower sheet and deliver the heated lower sheet to a main roller, wherein a plurality of heaters are disposed in an interior of the lower preheating roller along a circumferential surface of the lower preheating roller;
    an upper preheating roller configured to receive the middle sheet from the middle sheet supply assembly to heat the received middle sheet and deliver the heated middle sheet to the main roller,
    wherein a plurality of heaters are disposed in an interior of the upper preheating roller along a circumferential surface of the upper preheating roller,
    wherein the main roller is configured to join the lower sheet and the middle sheet received respectively from the lower preheating roller and the upper preheating roller, and
    wherein a plurality of heaters are disposed in an interior of the main roller along a circumferential surface of the main roller; and
    a heater disposed above the main roller to heat the lower sheet and the middle sheet that move along the main roller,
    wherein the lower sheet supply assembly comprises:
        a lower sheet forming unit configured to form the lower sheet, and
        a lower sheet storing unit configured to store the lower sheet,
    wherein the lower sheet forming unit comprises a lower mixing tank for mixing a material received from the raw material supply assembly, a lower extruder for extruding the mixed material, a lower mixing roller for compressing and kneading the extruded material by passing the material between one or more heating rollers, and a lower calendar roller for making a form of a plate from the compressed and kneaded material, wherein the lower calendar roller includes one or more heating rollers, through which the compressed and kneaded material is heated,
    wherein the lower sheet storing unit comprises a plurality of lower sheet support rollers and a control unit, wherein the plurality of lower sheet support rollers are controlled, by the control unit, to be elevated according to a difference between a first speed at which the lower sheet is introduced from the lower sheet forming unit to the lower sheet storing unit and a second speed at which the lower sheet is discharged from the lower sheet storing unit to adjust an amount of the lower sheet accommodated in the lower sheet storing unit, wherein when the first speed is higher than the second speed, the plurality of lower sheet support rollers are controlled to be lifted, wherein when the first speed is lower than the second speed, the plurality of lower sheet support rollers are controlled to be lowered,
    wherein the middle sheet supply assembly comprises:
        a middle sheet forming unit configured to form the middle sheet,
        wherein the middle sheet forming unit comprises a middle mixing tank for mixing a material received from the raw material supply assembly, a middle extruder for extruding the mixed material, a middle mixing roller for compressing and kneading the extruded material by passing the material between one or more heating rollers, and a middle calendar roller for making a form of a plate from the compressed and kneaded material, and wherein the middle calendar roller includes one or more heating rollers, through which the compressed and kneaded material is heated.

2. The flooring tile manufacturing apparatus of claim 1, further comprising:
    a first sheet supply assembly configured to supply a print sheet having a color or a pattern to the main roller;
    a second sheet supply assembly configured to supply a transparent sheet to the main roller;
    a first pressing roller configured to press the lower sheet and the middle sheet towards the main roller to bond the lower sheet and the middle sheet together; and
    a second pressing roller configured to press the print sheet and the transparent sheet towards the main roller to bond the print sheet and the transparent sheet to a surface of the middle sheet.

3. The flooring tile manufacturing apparatus of claim 2, further comprising:
    a cooling unit comprising a plurality of cooling rollers, by which a raw material of a tile, to which the lower sheet, the middle sheet, the print sheet, and the transparent sheet are sequentially bonded, passes,
wherein a cooler is disposed in each of the plurality of cooling rollers, and
wherein opposite surfaces of the raw material of the tile alternately contacts the plurality of cooling rollers.

\* \* \* \* \*